United States Patent
Suzuki et al.

(10) Patent No.: US 7,515,298 B2
(45) Date of Patent: Apr. 7, 2009

(54) IMAGE PROCESSING APPARATUS AND METHOD DETERMINING NOISE IN IMAGE DATA

(75) Inventors: Hiroyuki Suzuki, Toyokawa (JP);
Takayuki Nabeshima, Toyokawa (JP);
Hideyuki Toriyama, Toyokawa (JP);
Kazuhiro Ishiguro, Toyohashi (JP);
Toru Maegawa, Hino (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 597 days.

(21) Appl. No.: 10/774,662

(22) Filed: Feb. 10, 2004

(65) Prior Publication Data

US 2005/0083543 A1    Apr. 21, 2005

(30) Foreign Application Priority Data

Oct. 20, 2003    (JP) ............... 2003-359612

(51) Int. Cl.
G06F 15/00 (2006.01)
G06K 1/00 (2006.01)
H04N 1/60 (2006.01)
H04N 1/46 (2006.01)

(52) U.S. Cl. ........................ 358/1.9; 358/509
(58) Field of Classification Search ............. 358/1.9, 358/3.1, 509, 533, 516; 382/167
See application file for complete search history.

(56) References Cited

U.S. PATENT DOCUMENTS

| | | | |
|---|---|---|---|
| 5,689,590 A * | 11/1997 | Shirasawa et al. | 382/254 |
| 6,292,269 B1 * | 9/2001 | Kawai | 358/1.9 |
| 6,323,957 B1 * | 11/2001 | Ball | 358/1.9 |
| 7,072,075 B2 * | 7/2006 | Kondo et al. | 358/1.9 |
| 2002/0075527 A1 | 6/2002 | Ito | |

FOREIGN PATENT DOCUMENTS

| | | |
|---|---|---|
| JP | 2001-238053 A | 8/2001 |
| JP | 2002-185704 | 6/2002 |
| JP | 2002-185720 | 6/2002 |
| JP | 2002-271631 | 9/2002 |
| JP | 2003-008846 A | 1/2003 |

OTHER PUBLICATIONS

Japanese Office Action also a copy in English translation issued on May 1, 2006.

* cited by examiner

*Primary Examiner*—Douglas Q Tran
(74) *Attorney, Agent, or Firm*—Buchanan Ingersoll & Rooney PC

(57) ABSTRACT

An image processing apparatus reducing image noise caused at a device which has a stationary reading portion such as a CCD sensor and reads an image of a document by moving the document is structured as follows: the image processing apparatus determines whether full color image data read by the reading portion is out of a predetermined color space; it uses shift resisters to determine that the image data out of the predetermined color space continues in a sub scanning direction; and thus it detects a line-shaped dirt image caused by dirt or the like at the reading portion, and corrects the dirt image.

15 Claims, 15 Drawing Sheets

IMAGE NOISE REGION SIGNAL GENERATOR 405

MTF CORRECTOR 109

FIG.13

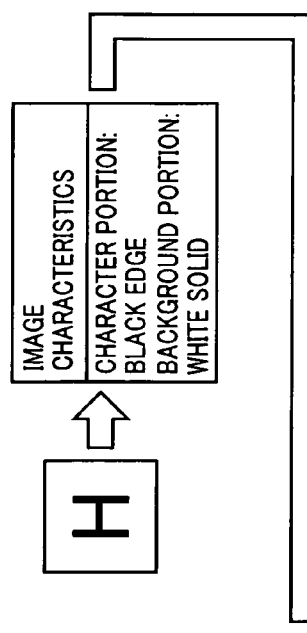

| IMAGE CHARACTERISTICS |
|---|
| CHARACTER PORTION: BLACK EDGE |
| BACKGROUND PORTION: WHITE SOLID |

| IMAGE AREA | IDENTIFYING SIGNALS ||||
| --- | --- | --- | --- | --- |
| | _AMI | _INEDG | _EDG | _BLACK |
| OUTSIDE EDGE PORTION | 1 | 1 | 0 | 1 |
| INSIDE EDGE PORTION | 1 | 0 | 0 | 0 |
| SOLID PORTION | 1 | 1 | 1 | 1 |

| MTF CONTROL SIGNAL FOR CMY |||| MTF CONTROL SIGNAL FOR K ||||
| --- | --- | --- | --- | --- | --- | --- | --- |
| BASE MANIPULATION | CMPX1-0 | EDGE ENHANCEMENT | CMPX2 | BASE MANIPULATION | KMPX1-0 | EDGE ENHANCEMENT | KMPX2 |
| MINIMUM PROCESSING | 1 | NO | 1 | MINIMUM PROCESSING | 1 | NO | 1 |
| MINIMUM PROCESSING | 1 | NO | 1 | NO MANIPULATION | 2 | YES | 0 |
| NO MANIPULATION | 2 | NO | 1 | NO MANIPULATION | 2 | NO | 1 |

FIG.14

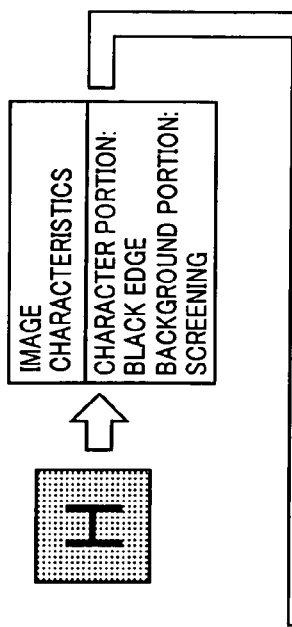

| IMAGE AREA | IDENTIFYING SIGNALS | | | |
|---|---|---|---|---|
| | _AMI | _INEDG | _EDG | _BLACK |
| OUTSIDE EDGE PORTION | 0 | - | - | - |
| INSIDE EDGE PORTION | 0 | - | - | - |
| SOLID PORTION | 0 | - | - | - |

IMAGE CHARACTERISTICS
CHARACTER PORTION: BLACK EDGE
BACKGROUND PORTION: SCREENING

| | MTF CONTROL SIGNAL FOR CMY | | | | MTF CONTROL SIGNAL FOR K | | | |
|---|---|---|---|---|---|---|---|---|
| | BASE MANIPULATION | CMPX1-0 | EDGE ENHANCEMENT | CMPX2 | BASE MANIPULATION | KMPX1-0 | EDGE ENHANCEMENT | KMPX2 |
| | SMOOTHING | 0 | NO | 1 | SMOOTHING | 0 | NO | 1 |
| | SMOOTHING | 0 | NO | 1 | SMOOTHING | 0 | NO | 1 |
| | SMOOTHING | 0 | NO | 1 | SMOOTHING | 0 | NO | 1 |

FIG.15

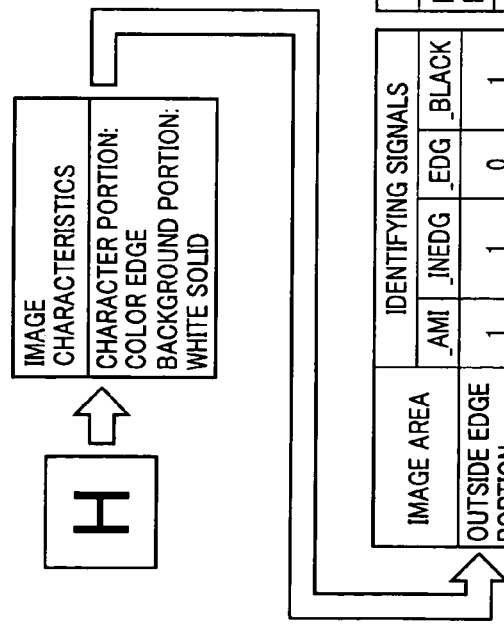

| IMAGE CHARACTERISTICS |
|---|
| CHARACTER PORTION: COLOR EDGE BACKGROUND PORTION: WHITE SOLID |

| IMAGE AREA | IDENTIFYING SIGNALS | | | |
|---|---|---|---|---|
| | _AMI | _INEDG | _EDG | _BLACK |
| OUTSIDE EDGE PORTION | 1 | 1 | 0 | 1 |
| INSIDE EDGE PORTION | 1 | 0 | 0 | 1 |
| SOLID PORTION | 1 | 1 | 1 | 1 |

| MTF CONTROL SIGNAL FOR CMY | | | | MTF CONTROL SIGNAL FOR K | | | |
|---|---|---|---|---|---|---|---|
| BASE MANIPULATION | CMPX1-0 | EDGE ENHANCEMENT | CMPX2 | BASE MANIPULATION | KMPX1-0 | EDGE ENHANCEMENT | KMPX2 |
| MINIMUM PROCESSING | 1 | NO | 1 | MINIMUM PROCESSING | 1 | NO | 1 |
| NO MANIPULATION | 2 | YES | 0 | NO MANIPULATION | 2 | YES | 0 |
| NO MANIPULATION | 2 | NO | 1 | NO MANIPULATION | 2 | NO | 1 |

FIG.16

NOISE REMOVAL FILTER 905

| 2 | 1 | 0 | 1 | 2 |

IMAGE PROCESSING APPARATUS AND METHOD DETERMINING NOISE IN IMAGE DATA

This application is based on Japanese Patent Application No. 2003-359612 filed with Japan Patent Office on Oct. 20, 2003, the entire content of which is hereby incorporated by reference.

BACKGROUND OF THE INVENTION

1. Field of the Invention

The present invention relates to an image processing apparatus and an image processing method. In particular, the present invention relates to an image processing apparatus and an image processing method capable of determining noise in image data obtained by moving a document with respect to a reading portion.

2. Description of the Related Art

There is conventionally known a technique so called "sheet through type (moving document scanning type) reading" incorporated into an image reading apparatus used in an MFP (Multi Function Peripheral), a digital copying machine, a facsimile, and the like. This technique allows an image to be read by moving a document with respect to a stationary reading portion of the image reading apparatus, instead of moving a reading portion with respect to a document.

Thus, if a foreign material such as dirt, dust, paper dust, or a flaw (hereinafter collectively called "dirt") is on a reading position, the reading portion will always read the dirt while the document is being moved, unless the dirt moves to a position other than the reading position. Therefore, light reflected from an image of the document at a position corresponding to the position of the dirt does not reach the reading portion, causing a black line (image noise) extending on a read image and an output image in a sub scanning direction.

Consequently, it is contemplated to remove such dirt by cleaning a platen regularly. However, it has been difficult to always keep the platen clean, without any dirt.

In view of such a problem, Japanese Laid-Open Patent Publication No. 2002-185720 discloses a technique to see the continuity of read image data to detect a white or black line.

Japanese Laid-Open Patent Publication No. 2002-185704 discloses a technique to detect an irregular pixel from read image data and limit an effective reading position for a document depending on the position of the irregular pixel. In this technique, the continuity, position, and line width of the image data is detected for the detection of an irregular image.

Japanese Laid-Open Patent Publication No. 2002-271631 discloses an image reading apparatus including first reading means to read color image data and second reading means located offset from the first reading means in a sub scanning direction to read monochrome image data, which detects noise based on a comparison result of density values read by the first and the second reading means, and on a result of edge detection in the image data read by the first reading means.

SUMMARY OF THE INVENTION

An object of the present invention is to provide an image processing apparatus and an image processing method capable of reducing image noise in color image data read by a reading portion.

To achieve the foregoing object, according to one aspect of the present invention, an image processing apparatus includes an input portion inputting color image data read by a reading portion, a detector detecting whether the input color image data is out of a predetermined color space, and a determining portion determining that the color image data is image noise when the detector detects that the color image data is out of the predetermined color space.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 13 to 15 show specific examples of a process effected by an MTF control signal generator in the region identifying portion.

FIG. 16 shows a configuration of a noise removal filter.

DESCRIPTION OF THE PREFERRED EMBODIMENTS

Hereinafter, an embodiment of the present invention will be described with reference to the drawings.

When reading an image of a document by sheet through type reading, an image processing apparatus in accordance with the present embodiment distinguishes a line-shaped image caused by dirt (a dirt image) from the image of the document to detect and correct the dirt image.

Figure 1:
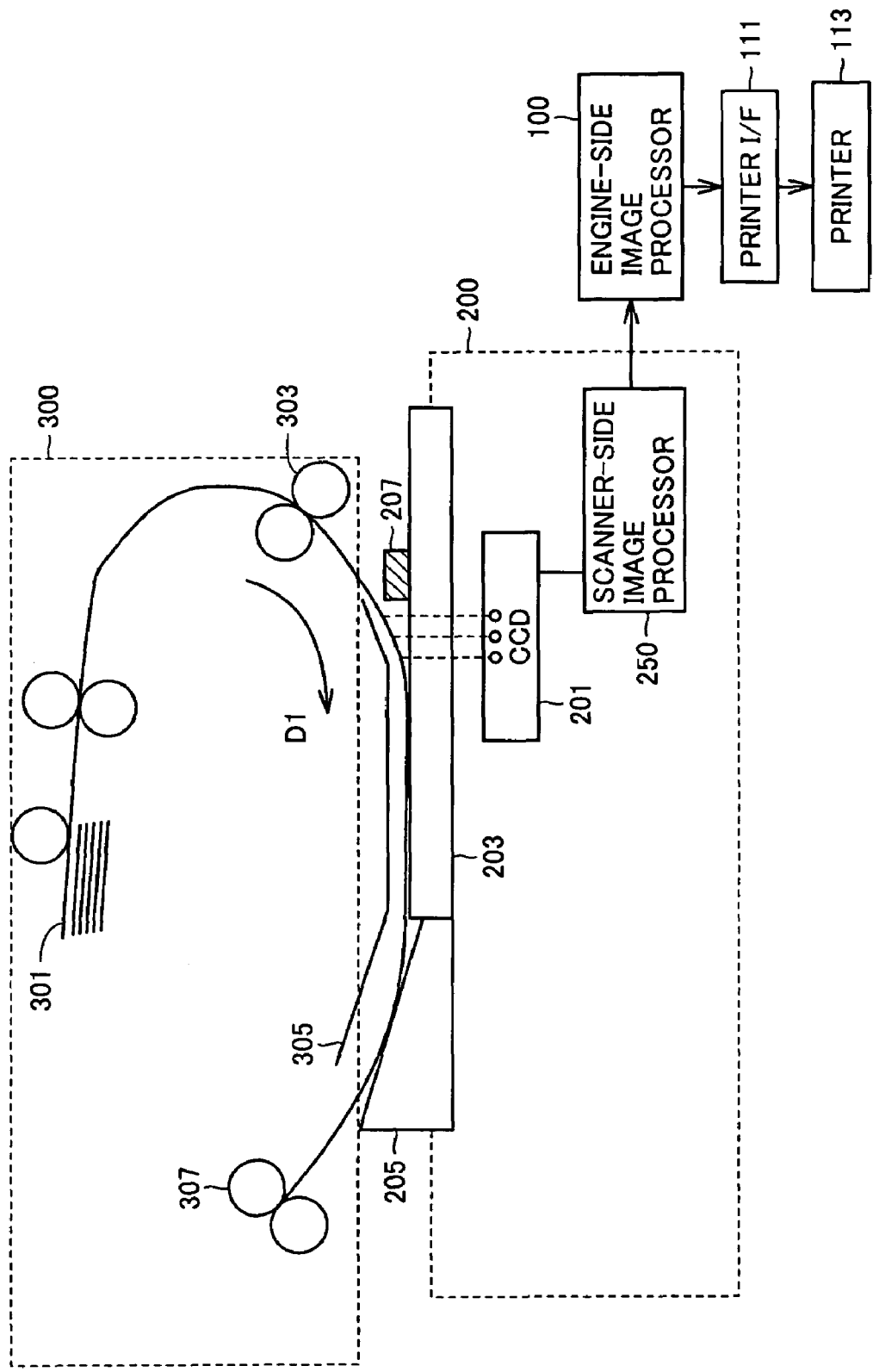
FIG. 1 shows a structure of an image producing apparatus using an image processing apparatus in accordance with one embodiment of the present invention.

Referring to FIG. 1, roughly described, an image producing apparatus includes a feeding system 300 for feeding a document, a reading system 200 for reading an image of the document, an engine-side image processor 100 as an image processing apparatus, a printer interface 111, and a printer 113.

Feeding system 300 includes an upper control plate 305 for guiding the feeding of the document in the vicinity of a document reading position, a document passing guide 205, a pair of timing rollers 303 driven in accordance with a timing signal, a pair of intermediate rollers 307 driven in the same way as the pair of timing rollers 303, and a pad 207 for positioning the document to float above a platen glass 203 so as not to focus on dirt on platen glass 203.

Reading system 200 includes platen glass 203 serving as a platen for bearing a document, a CCD 201 serving as a reading portion, and a scanner-side image processor 250.

A document 301 is fed between platen glass 203 and upper control plate 305 in a direction shown by an arrow D1, in synchronization with a reading operation of CCD 201 by means of the pair of timing rollers 303. While being fed, its image is read sequentially at a reading position of CCD 201 by means of three line sensors for R (red), G (green) and B (blue) included in CCD 201.

When only one side of document 301 is to be read, the document continues to be fed through document passing guide 205 and the pair of intermediate rollers 307 to an exit portion (not shown). When both sides of document 301 are to be read, the document is fed to a reversing device (not shown), where the document is reversed. The reversed document is fed to the pair of timing rollers 303 again, and an image on the other side of the document is read as in reading one side of the document. The document is then fed through the pair of intermediate rollers 307 to the exit portion (not shown).

Figure 2:
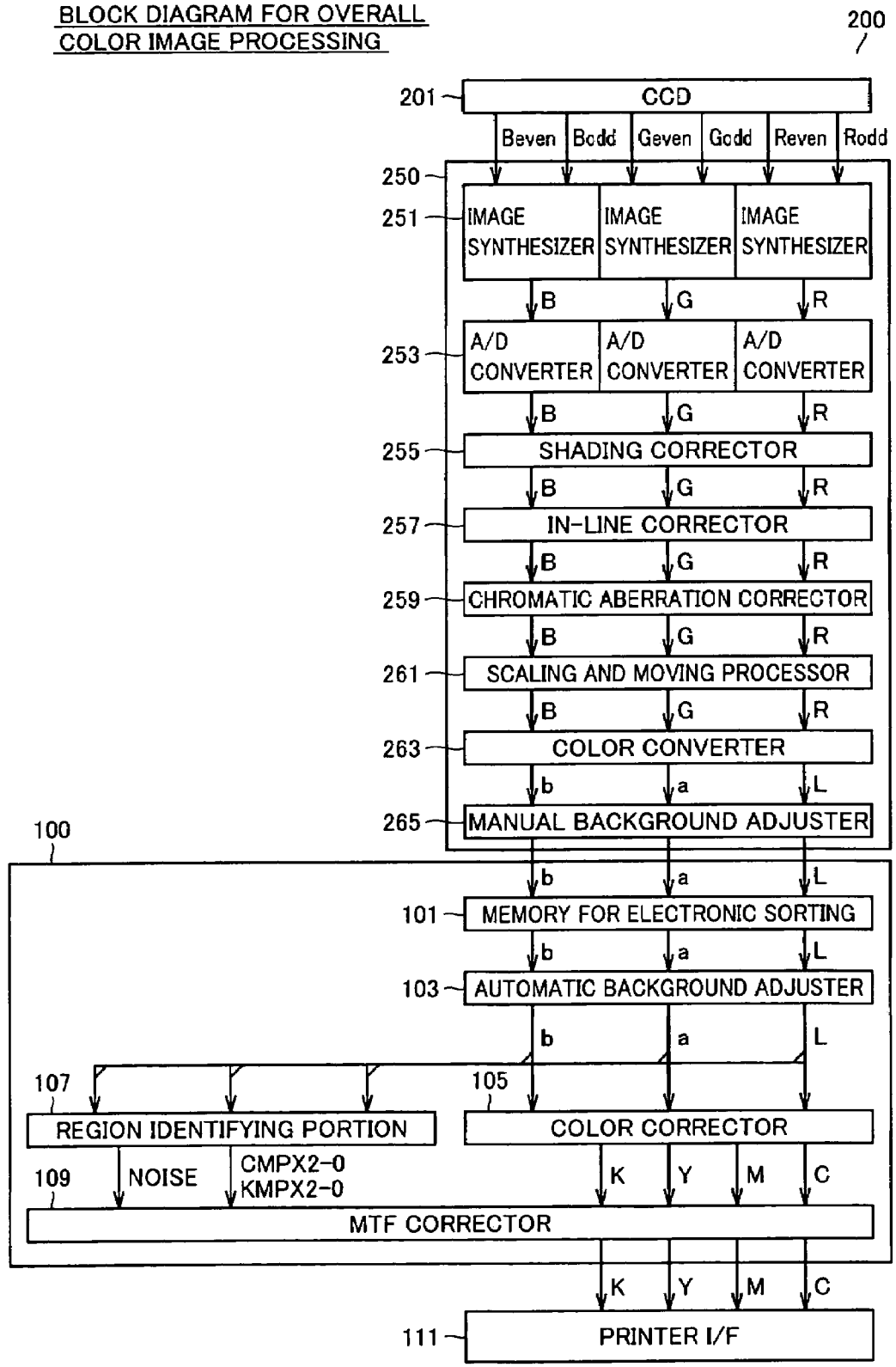
FIG. 2 is a block diagram showing a configuration of a reading system 200, an engine-side image processor 100, and a printer interface 111 in FIG. 1.

FIG. 2 is a block diagram showing a configuration of reading system 200, engine-side image processor 100, and printer interface 111 in FIG. 1.

Referring to FIG. 2, scanner-side image processor 250 includes an image synthesizer 251 outputting RGB signals by synthesizing outputs read by CCD 201, an A/D (analog/digital) converter 253 performing A/D conversion of outputs of image synthesizer 251, a shading corrector 255 subjecting RGB data converted to digital signals to shading correction, an in-line corrector 257 subjecting the RGB data to in-line correction, a chromatic aberration corrector 259 subjecting the RGB data to chromatic aberration correction, a scaling and moving processor 261 scaling and moving the RGB image data, a color converter 263 converting the RGB data to Lab data, and a manual background adjuster 265 adjusting a background.

Engine-side image processor 100 includes memory 101 for electronic sorting, an automatic background adjuster 103, a color corrector 105 subjecting the image data to color correction, a region identifying portion 107 identifying a region of the image data, and an MTF (Modulation Transfer Function) corrector 109 performing MTF correction based on the identification result by region identifying portion 107.

Figure 3:
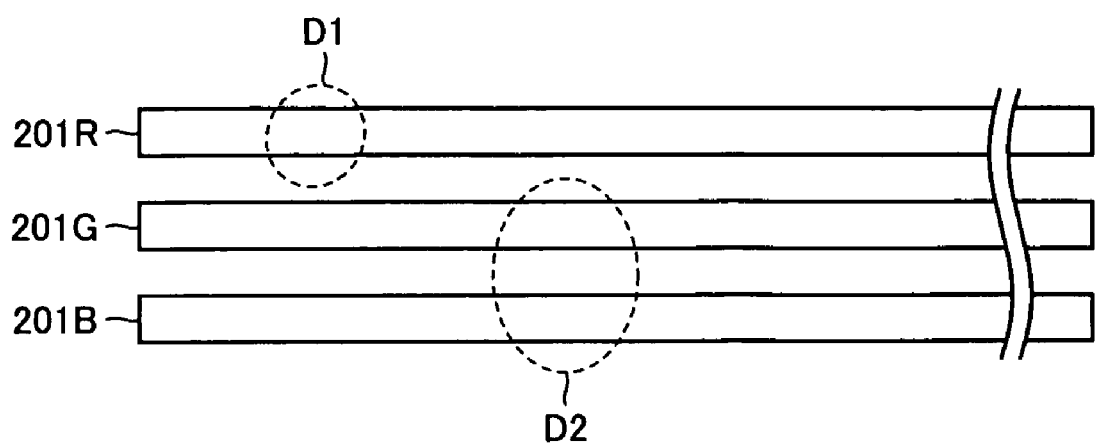
FIG. 3 is a plan view of a CCD (Charge-Coupled Device) 201.

FIG. 3 is a plan view of CCD 201.

Referring to FIG. 3, CCD 201 includes line sensors 201R, 201G, and 201B corresponding to R, G, and B, respectively. These line sensors are equally spaced, and designed to delay outputs of line sensor 201G for G and line sensor 201B for B to synchronize them to an output of line sensor 201R for R.

In such line sensors for full color, if there is dirt at a position D1, the outputs of the sensors will be as follows: R=0, G=255, and B=255. If there is dirt at a position D2, the outputs of the sensors will be as follows: R=255, G=0, and B=0.

In this manner, in the case where three line sensors for RGB are placed in a sub scanning direction at predetermined intervals, if there is dirt having a size enough to be sensed by one line sensor only or by two line sensors, an output (reflectance data) can be obtained only from a line sensor which does not sense the dirt, and almost no output can be obtained from the sensor(s) sensing the dirt. On the contrary, in the case of an output of image data obtained by reading an image of a document, certain degree of values can be obtained from all the sensors even if the document is colored only in red (or green, or blue).

More specifically, color data obtained from a dirt image is included in a color space which could never be obtained from a normal image. The image processing apparatus in accordance with the present embodiment focuses attention on such characteristics to detect the dirt image and correct the image.

In addition, an MTF value of an edge of a dirt image is greater than an MTF value of an edge existing in an image of a document. The image processing apparatus (engine-side image processor 100) in accordance with the present embodiment focuses attention on such a difference between the MTF value of the edge of the dirt image and the MTF value of the edge of the image of the document to detect the dirt image for correction.

Figure 4:
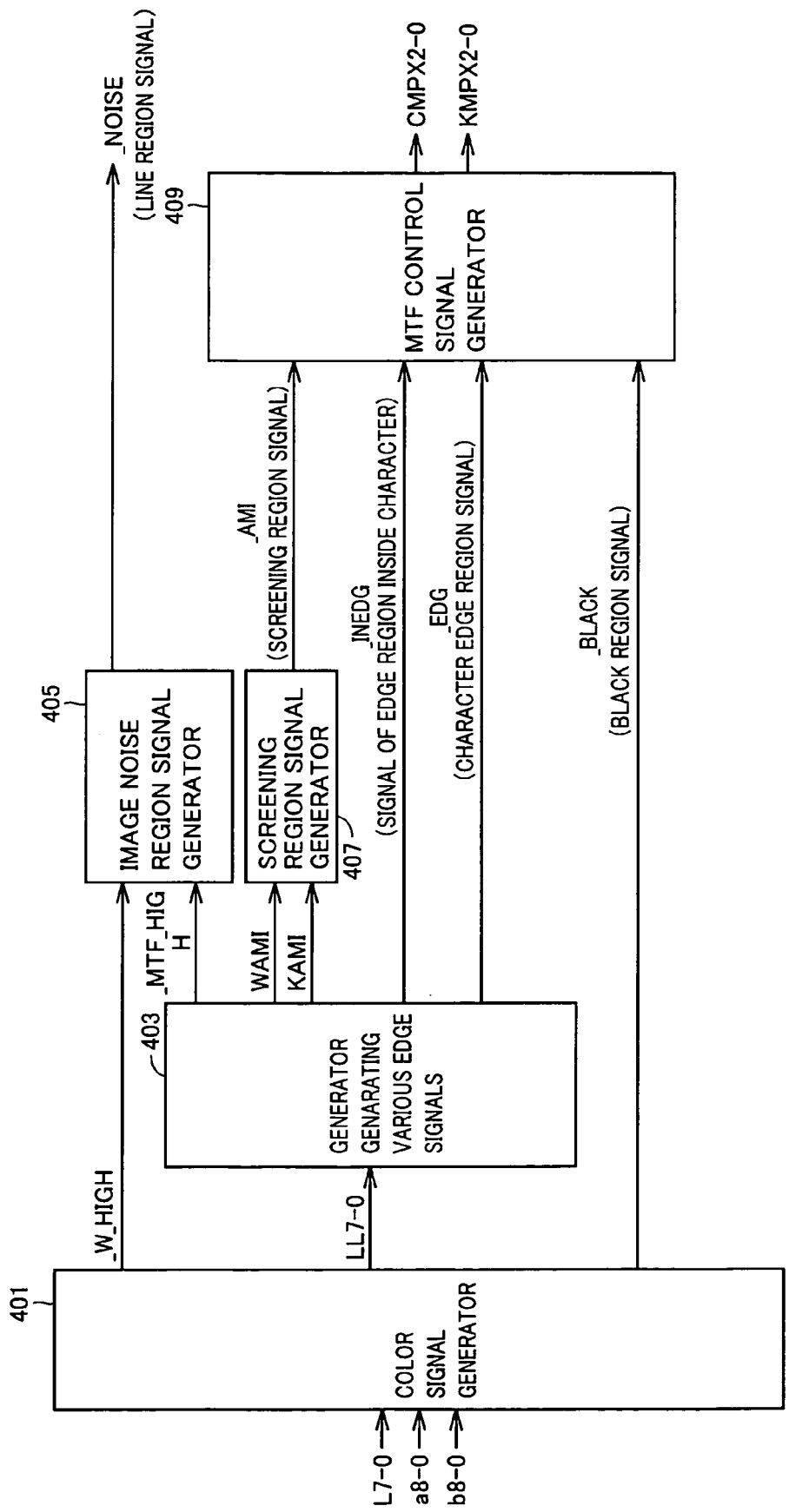
FIG. 4 is a block diagram showing a configuration of a region identifying portion 107 in FIG. 2.

FIG. 4 is a block diagram showing a configuration of region identifying portion 107 in engine-side image processor 100 of FIG. 2.

Referring to FIG. 4, region identifying portion 107 includes a color signal generator 401, a generator 403 generating various edge signals, an image noise region signal generator 405, a screening (halftone dots) region signal generator 407, and an MTF control signal generator 409.

Color signal generator 401 uses data L, data a, and data b (8 bits (7-0), 9 bits (8-0), and 9 bits (8-0), respectively), which are generated at color converter 263, as input data to generate a color signal (LL7-0), a black region signal (_BLACK), and a signal of a region out of a color space (_W_HIGH).

Generator 403 generating various edge signals uses the color signal as input data to generate a high MTF region signal (_MTF_HIGH), isolated-point signals for identifying the image data as the data of screening (WAMI, KAMI), a signal of an edge region inside a character (_INEDG), and a character edge region signal (_EDG).

Image noise region signal generator 405 generates a line region signal (_NOISE) in accordance with the signal of the region out of the color space (_W_HIGH) and the high MTF region signal (_MTF_HIGH).

Detection of a dirt image is performed in accordance with the signal of the region out of the color space (_W_HIGH) and the high MTF region signal (_MTF_HIGH). As the detection is performed, the line region signal (_NOISE) becomes active, and correction of the dirt image is performed.

Screening region signal generator 407 outputs a screening region signal (_AMI) in accordance with the isolated-point signals for identifying the image data as the data of screening (WAMI, KAMI).

MTF control signal generator 409 uses the screening region signal (_AMI), the signal of the edge region inside a character (_INEDG), the character edge region signal (_EDG), and the black region signal (_BLACK) as input data to generate signals (CMPX2-0, KMPX2-0) controlling MTF corrector 109.

Figure 5:
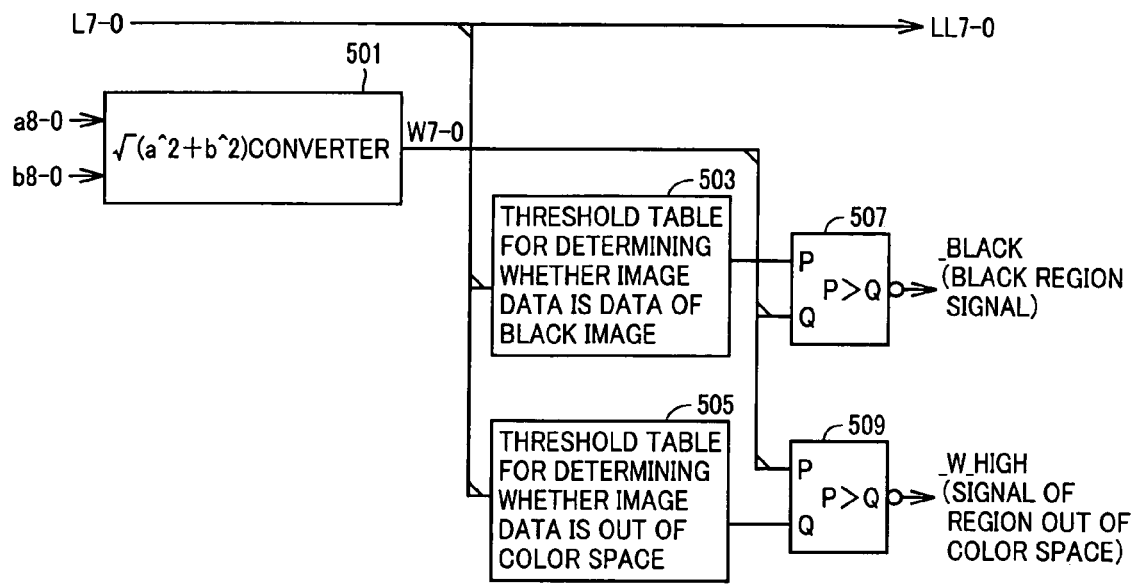
FIG. 5 shows a configuration of a color signal generator 401 in FIG. 4.

FIG. 5 shows a configuration of color signal generator 401 in FIG. 4.

Referring to FIG. 5, color signal generator 401 includes a converter 501, a threshold table 503 for determining whether the image data is the data of a black image, a threshold table 505 for determining whether the image data is out of the color space, and comparators 507 and 509.

Converter 501 uses data a and data b (a8-0, b8-0) to calculate $\sqrt{(a^2+b^2)}$ to generate chromaticness data (W7-0). Color signal generator 401 converts L (lightness) data (L7-0) with threshold table 503 for determining whether the image data is the data of a black image to generate a threshold, compares the threshold with the chromaticness data (W7-0), and generates the black region signal (_BLACK) in accordance with the comparison result.

In addition, color signal generator 401 converts the lightness data (L7-0) with threshold table 505 for determining whether the image data is out of the color space to generate a threshold, compares the threshold with the chromaticness data (W7-0), and generates the signal of the region out of the color space (_W_HIGH) in accordance with the comparison result.

The threshold for generating the black region signal (_BLACK) and the threshold for generating the signal of the region out of the color space (_W_HIGH) are generated in accordance with the lightness (L) data (L7-0), because the amount of chromaticness depends on lightness nonlinearly.

Figure 10:
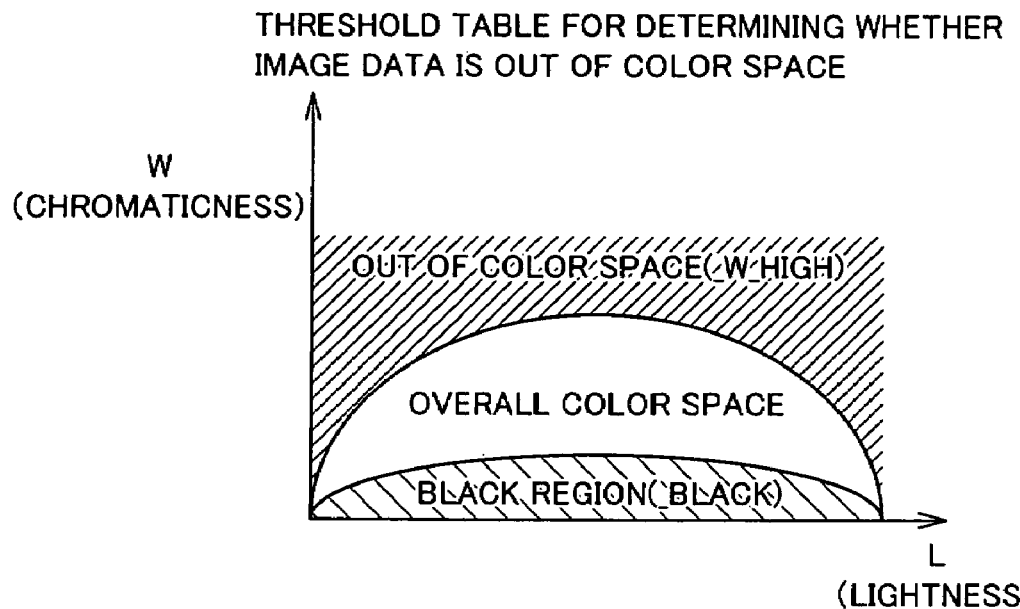
FIG. 10 shows contents of a threshold table for determining whether image data is out of a color space.

FIG. 10 shows a table having contents of the above threshold tables.

Referring to FIG. 10, a threshold for determining chromaticness with respect to lightness is recorded in the table. In accordance with this table, a threshold is determined from lightness, and the threshold and chromaticness are used to determine whether the chromaticness is in the black region, in the color space, or out of the color space.

It is to be noted that the table in FIG. 10 is determined by characteristics and the like of CCD201. A value "out of the color space" is a value which could not be obtained by normally reading a document, and a pixel located at this position is considered as noise caused by a dirt image and thus to be corrected. In this embodiment, to improve the accuracy of detecting a dirt image, when pixels out of the color space continue in the sub scanning direction, the pixels are determined as a dirt image.

A region other than the region "out of the color space" is a region of data obtained by normally reading a document, and is called an "effectively read color space". The black region is located within the effectively read color space.

Figure 6:
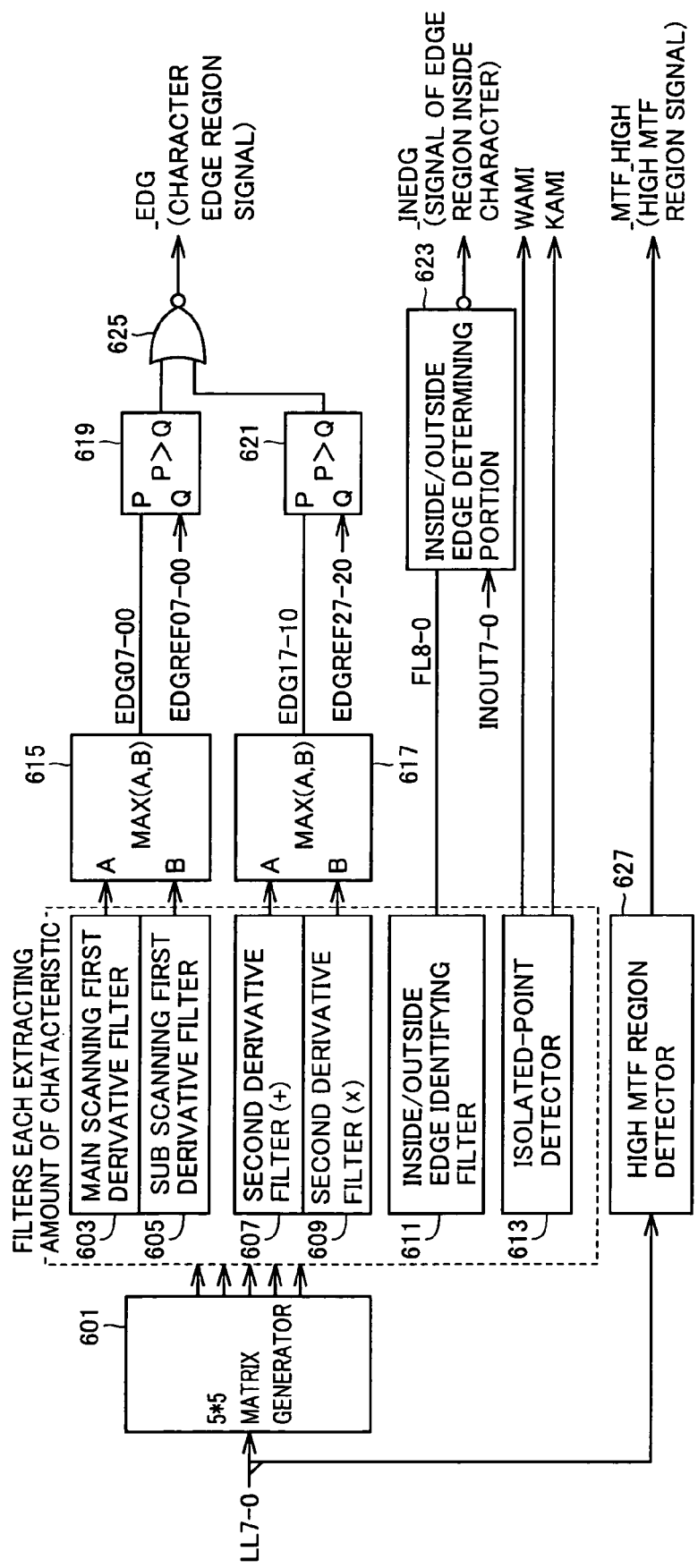
FIG. 6 is a block diagram showing a configuration of a generator 403 generating various edge signals.

FIG. 6 is a block diagram showing a configuration of generator 403 generating various edge signals.

Referring to FIG. 6, generator 403 generating various edge signals includes a 5×5 matrix generator 601, filters each extracting an amount of a characteristic, selectors 615 and 617, comparators 619 and 621, an inside/outside edge determining portion 623, a high MTF region detector 627, and a gate 625.

As the filters each extracting an amount of a characteristic are provided a main scanning first derivative filter 603, a sub scanning first derivative filter 605, a second derivative filter (+) 607, a second derivative filter (×) 609, an inside/outside edge identifying filter 611, and an isolated-detector 613.

First, data (LL7-0) from color signal generator 401 is rendered into a 5×5 matrix in the 5×5 matrix generator 601. Based on the matrix, amounts of characteristics of the image are extracted by the filters each extracting an amount of a characteristic.

Selector 615 outputs the greater one of the outputs of main scanning first derivative filter 603 and sub scanning first derivative filter 605. Selector 617 outputs the greater one of the outputs of second derivative filter (+) 607 and second derivative filter (×) 609.

Comparator 619 compares the output of selector 615 (EDG07-00) with an edge reference signal (EDGREF07-00), and if the output of selector 615 is greater, comparator 619 outputs an active signal. Comparator 621 compares the output of selector 617 (EDG17-10) with an edge reference signal (EDGREF27-20), and if the output of selector 617 is greater, comparator 621 outputs an active signal.

Gate 625 outputs the character edge region signal (_EDG) in accordance with the outputs of comparators 619 and 621.

The character edge region signal (_EDG) becomes "L" active when either one of the following conditions is met: a condition that the maximum value (EDG07-00=P) of the values processed by the main and sub scanning first derivative filters is compared with the edge reference signal (EDGREF07-00=Q) and P>Q is obtained, and a condition that the maximum value (EDG17-10=P) of the values processed by the + type and × type second derivative filters is compared with the edge reference signal (EDGREF27-20=Q) and P>Q is obtained.

Data (FL8-0) generated by inside/outside edge identifying filter 611 is compared with a determination reference signal (INOUT7-0) in inside/outside edge determining portion 623. Based on the result of the determination, the signal of the edge region inside a character (_INEDG) is generated. The signal of the edge region inside a character (_INEDG) becomes "L" active when the image is of an edge inside a character.

The isolated-point signals for identifying the image data as the data of screening (WAMI, KAMI) are generated by isolated-point detector 613.

WAMI (white isolated-point signal) is a signal which becomes "H" active when the value of a target pixel (V33) in 5×5 matrix data is greater than each value of eight pixels surrounding the target pixel and is greater than an average value of two pixels in each of eight directions (up and down, right and left, and diagonal directions) from the target pixel.

KAMI (black isolated-point signal) is a signal which becomes "H" active when the value of a target pixel (V33) in 5×5 matrix data is smaller than each value of eight pixels surrounding the target pixel and is smaller than an average value of two pixels in each of eight directions (up and down, right and left, and diagonal directions) from the target pixel.

The high MTF region signal (_MTF_HIGH) is a signal generated by high MTF region detector 627.

Figure 7:
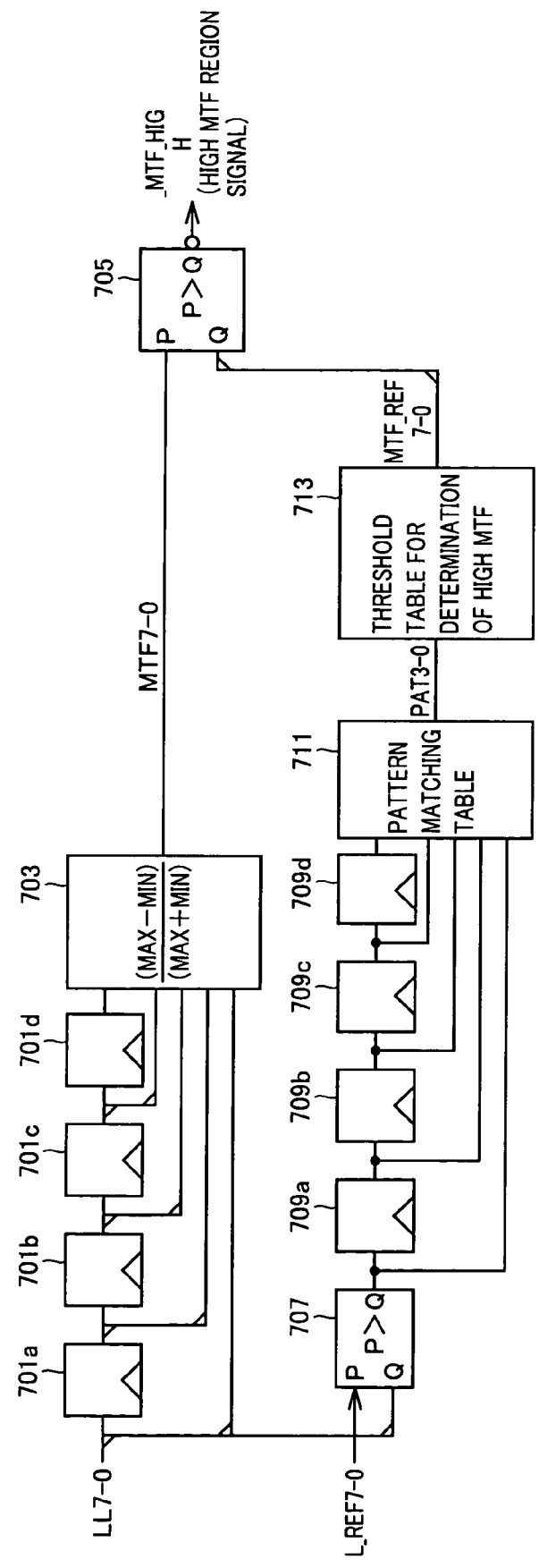
FIG. 7 shows a configuration of a high MTF (Modulation Transfer Function) region detector 627 in FIG. 6.

FIG. 7 shows a configuration of high MTF region detector 627 in FIG. 6.

Referring to FIG. 7, high MTF region detector 627 includes shift registers 701a-701d holding lightness-data of five adjacent pixels in the main scanning direction, a comparator 707, shift registers 709a-709d holding an output of comparator 707, calculating portion 703 performing calculation of (MAX−MIN)/(MAX+MIN), a pattern matching table 711, a threshold table 713 for determination of a high MTF, and a comparator 705.

In calculating portion 703, the calculation of (MAX−MIN)/(MAX+MIN) is performed on the lightness data (LL7-0) of the five adjacent pixels in the main scanning direction, and as a result of the calculation, an MTF value (MTF7-0) of that portion is determined. It is to be noted that MAX represents the maximum value of the values of the five pixels, and MIN represents the minimum value of the values of the five pixels.

On the other hand, the lightness data (LL7-0) is binarized by being compared with a reference value (L1_REF7-0) in comparator 707. The lightness data for the five adjacent pixels in the main scanning direction is matched to a pattern in pattern matching table 711, and converted to line width data (PAT3-0). The line width data (PAT3-0) is processed with threshold table 713 for determination of a high MTF, and threshold data for determination of a high MTF (MTF_REF7-0) is generated.

The MTF value (MTF7-0) is compared with the threshold data for determination of a high MTF (MTF_REF7-0), and based on the comparison result, the high MTF region signal (_MTF_HIGH) is generated.

Figure 11:
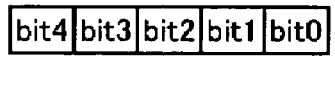
FIG. 11 shows contents of a pattern matching table 711.
Figure 12:
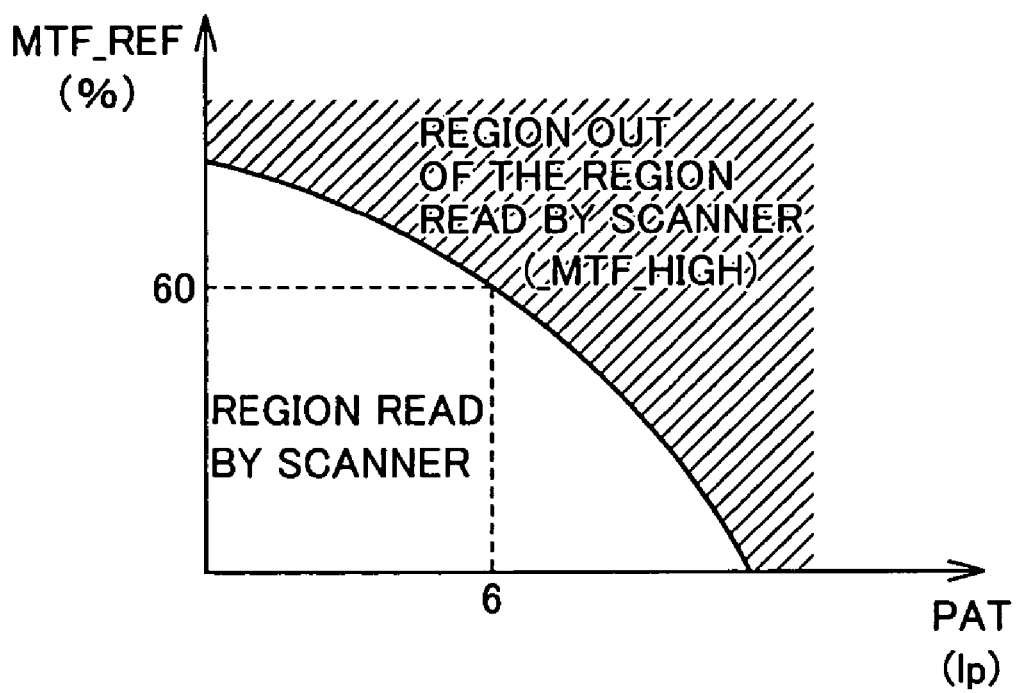
FIG. 12 shows contents of a threshold table 713 for determination of a high MTF.

FIGS. 11 and 12 show contents of pattern matching table 711 and threshold table 713 for determination of a high MTF, respectively.

Referring to FIG. 11, the pattern matching table is a table for determining the size of a line width (lp) depending on the arrangement of a black pixel (data "1") obtained by binarization. Data indicating the size of the line width is PAT3-0, and the greater PAT3-0 is, the narrower the line width is.

Referring to FIG. 12, the threshold table for determination of a high MTF is a table for determining a threshold for determination of an MTF according to the size of the line width (lp) data (PAT3-0).

The threshold table for determination of a high MTF is determined in accordance with characteristics of the image reading apparatus (scanner). The "REGION READ BY SCANNER" in FIG. 12 shows a range of MTF values assumed to be contained in data obtained by normally reading a document, and the "REGION OUT OF THE REGION READ BY SCANNER" shows a range of MTF values assumed not to be obtained by normally reading a document. A pixel having an MTF value in the "REGION OUT OF THE REGION READ BY SCANNER" is assumed to be due to a dirt image, and is corrected. It is to be noted that, in this embodiment, to improve the accuracy of detecting a dirt image, when pixels out of the region read by the scanner continue in the sub scanning direction, the pixels are determined as a dirt image.

Figure 8:
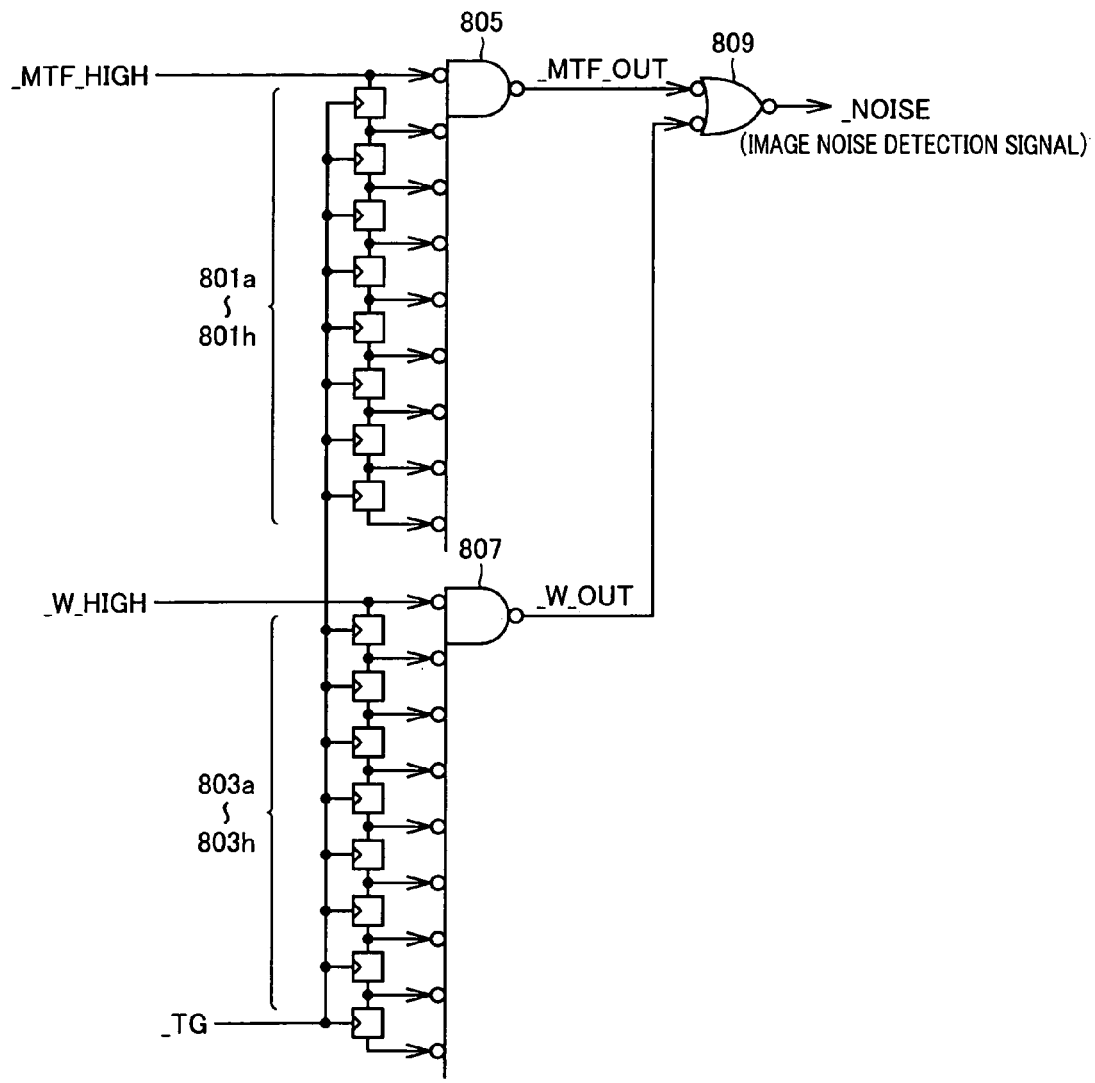
FIG. 8 is a block diagram showing a configuration of an image noise region signal generator 405 in FIG. 4.

FIG. 8 is a block diagram showing a configuration of image noise region signal generator 405 in FIG. 4.

Referring to FIG. 8, image noise region signal generator 405 includes shift registers 801a-801h connected in eight stages to process the high MTF region signal (_MTF_HIGH), shift registers 803a-803h connected in eight stages to process the signal of the region out of the color space (_W_HIGH), a gate 805 receiving signals from shift registers 801a-801h to output a signal_MTF_OUT, a gate 807 receiving signals from shift registers 803a-803h to output a signal_W_OUT, and a gate 809 outputting the image noise detection signal (_NOISE) in accordance with the outputs of gates 805 and 807.

Shift registers 801a-801h and 803a-803h are triggered by a line synchronization signal (_TG) to shift held values. Since the line synchronization signal (_TG) is a signal which becomes active whenever the CCD performs one-line reading, line delay of an input value is performed by shift registers 801a-801h, 803a-803h and gates 805 and 807, allowing checking of the continuity of a pixel having a high MTF value or a pixel out of a predetermined color space in the sub scanning direction.

With the above configuration, image noise region signal generator 405 outputs the image noise region signal (_NOISE) which becomes "L" active when pixel addresses in the signal of the region out of the color space (_W_HIGH) generated by color signal generator 401 or in the high MTF region signal (_MTF_HIGH) generated by high MTF region detector 627 in generator 403 generating various edge signals continue in the sub scanning direction.

Figure 9:
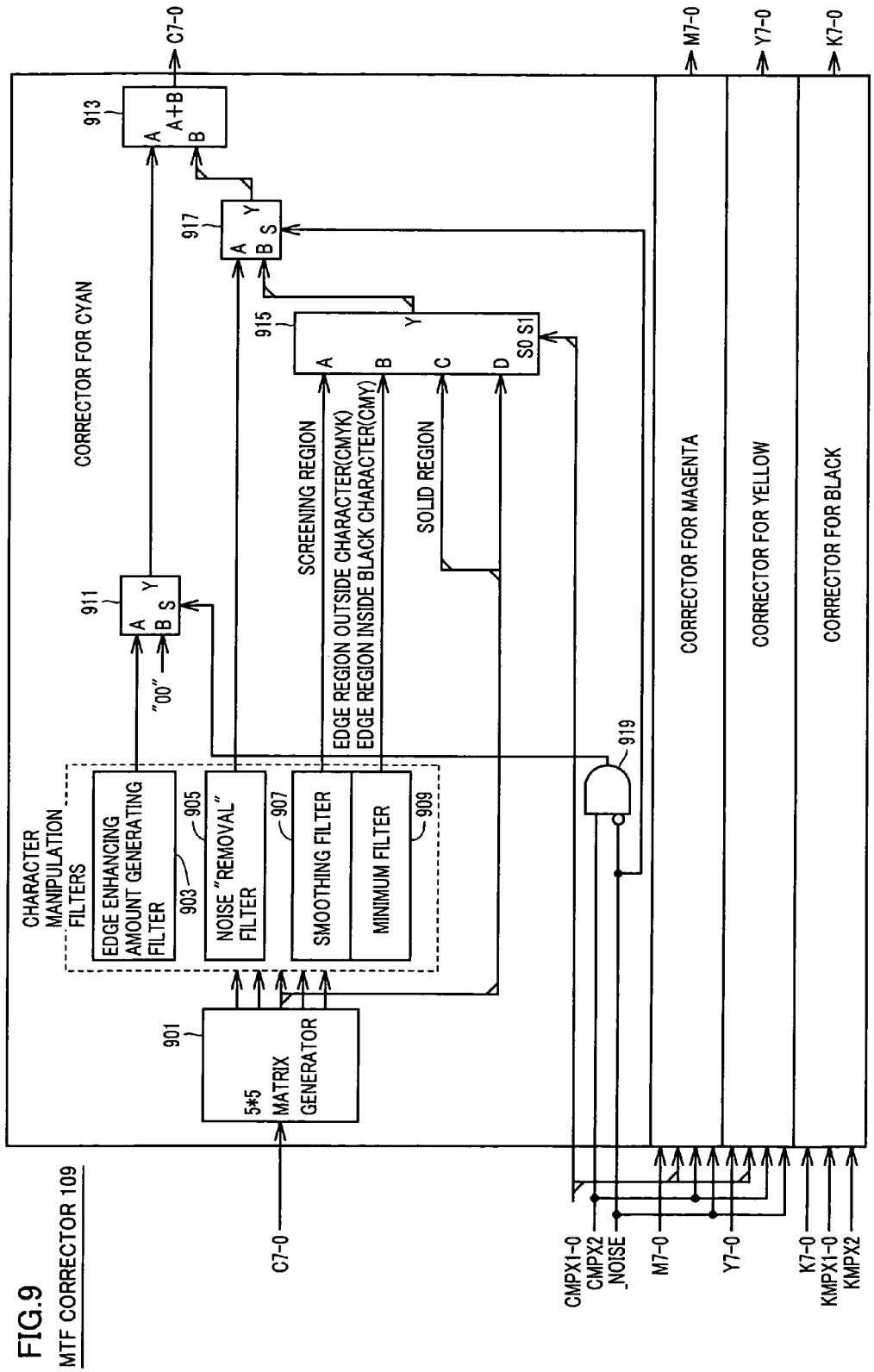
FIG. 9 is a block diagram showing a configuration of an MTF corrector 109 in FIG. 2.

FIG. 9 is a block diagram showing a configuration of MTF corrector 109 in FIG. 2.

Referring to FIG. 9, MTF corrector 109 includes four correctors correcting color data of cyan, magenta, yellow, and black, respectively. Thus, MTF corrector 109 can process four color data simultaneously in parallel. Since the four correctors have a common configuration, hereinafter only the corrector for cyan will be described in detail representatively.

The corrector for cyan includes a 5×5 matrix generator 901, character manipulation filters, selectors 911, 915 and 917, an adder 913, and a gate 919.

The character manipulation filters include an edge enhancing amount generating filter 903, a noise removal filter 905, a smoothing filter 907, and a minimum filter 909.

Correction of cyan, magenta, and yellow is controlled by the control signal (CMPX1-0) generated by region identifying portion 107. Correction of black is controlled by the control signal (KMPX1-0) generated by region identifying portion 107.

First, in accordance with input data of each color, a 5×5 matrix is generated by 5×5 matrix generator 901. Thereafter, data on an edge enhancing amount, data with noise removed, data processed by smoothing, and data processed by minimum processing are generated by edge enhancing amount generating filter 903, noise removal filter 905, smoothing filter 907, and minimum filter 909, respectively. It is to be noted that noise removal filter 905 perform processing using a 5×1 matrix (see FIG. 16).

Respective data generated by the character manipulation filters are selected in selectors 911 and 915, depending on the MTF control signal (CMPX1-0).

More specifically, if CMPX1-0="0", selector 915 determines the image data as the data of a screening region, selects the value of smoothing filter 907, and outputs it. If CMPX1-0="1", selector 915 determines the image data as the data of an edge region outside a character or of an edge region inside a black character, selects the value of minimum filter 909, and outputs it. If CMPX1-0="2", selector 915 determines the image data as the data of a solid region, selects the value not manipulated by the filters, and outputs it.

Whether or not to perform edge enhancement is controlled by CMPX2 and the image noise region signal (_NOISE).

If the image data is not the data of a noise image and CMPX2="0", selector 911 selects the value of edge enhancing amount generating filter 903 for edge enhancement. Otherwise, selector 911 selects the value "00" so as not to perform edge enhancement. That is, edge enhancement is prohibited when _NOISE="0" or CMPX2="1", and allowed when CMPX2="0".

Further, whether or not to use the data resulting from the processing by noise removal filter 905 is selected in selector 917, depending on the image noise region signal (_NOISE).

If _NOISE="0", the data processed by noise removal filter 905 is selected, and if _NOISE="1", the data processed by the filters other than the noise removal filter (the output of selector 915) is selected.

Finally, the data selected depending on CMPX1-0 and _NOISE is added to the data on edge enhancement in adder 913.

FIGS. 13 to 15 show specific examples of a process effected by MTF control signal generator 409 in region identifying portion 107.

MTF control signal generator 409 includes tables, and uses four region identifying attribute signals _AMI, _INEDG, _EDG, and _BLACK as input addresses to generate the MTF control signals (C/KMPX2-0).

For example, when an image has characteristics that its character portion has a black edge and its background portion is in solid white as shown in FIG. 13, the signals _AMI, _INEDG, _EDG, and _BLACK for an area of an edge portion outside the character in the image are set to "1", "1", "0", and "1", respectively. In the MTF control signal for CMY, the values of CMPX1-0 are set to "1" to perform minimum processing in the base manipulation, and the value of CMPX2 is set to "1" so as not to perform edge enhancement. At the same time, in the MTF control signal for K (black), the values of KMPX1-0 are set to "1" to perform minimum processing in the base manipulation, and the value of KMPX2 is set to "1" so as not to perform edge enhancement.

FIG. 14 shows a process when an image has characteristics that its character portion has a black edge and its background portion has screening.

FIG. 15 shows a process when an image has characteristics that its character portion has a color edge and its background portion is in solid white.

Figure 16:
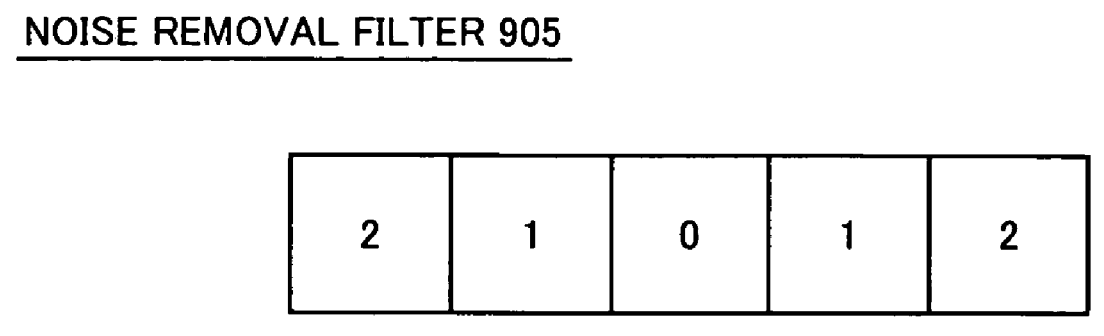

FIG. 16 shows a configuration of the aforementioned noise removal filter 905. As shown in FIG. 16, the noise removal filter has a value "0" at a target pixel, "1" at pixels adjacent to the target pixel on both sides, and "2" at pixels next to the pixels adjacent to the target pixel on both sides. By using noise removal filter 905, the value of the target pixel can be replaced with an average value of the surrounding pixels.

As has been described above, the image processing apparatus in accordance with the present embodiment can determine and remove line-shaped noise due to dirt in color image data, by detecting that the read color image data is out of a predetermined color space and it continues in the sub scanning direction. It is to be noted that the detection that the data out of the color space continues in the sub scanning direction is not essential.

Further, the image processing apparatus in accordance with the present embodiment detects the presence of an edge portion of a dirt image having a value greater than that of a normal MTF value, detects the dirt image according to the continuity of the presence in the sub scanning direction, and modifies the dirt image. It is to be noted that the detection that such an edge portion continues in the sub scanning direction is not essential.

With the configuration mentioned above, according to the present embodiment, it becomes possible to provide an image processing apparatus and an image producing apparatus capable of reducing image noise caused when a document is read by a device performing sheet through type reading.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus, comprising:
   an input portion inputting color image data read from a document by a reading portion;
   a converter that converts a portion of the color image data into chromaticness data;
   a detector detecting, based on lightness data and chromaticness data, whether said input color image data is out of a predetermined color space; and
   a determining portion determining that said color image data is image noise when said detector detects that said color image data is out of said predetermined color space.

2. The image processing apparatus according to claim 1, wherein said predetermined color space is further determined in accordance with a characteristic of said reading portion.

3. The image processing apparatus according to claim 1, wherein, when the color image data detected by said detector to be out of said predetermined color space continues in a sub scanning direction of said reading portion, said determining portion determines the continuing color image data as image noise.

4. The image processing apparatus according to claim 1, further comprising a corrector correcting the color image data determined by said determining portion as image noise.

5. The image processing apparatus according to claim 1, wherein said reading portion includes a reading portion having a plurality of line sensors arranged in a sub scanning direction at predetermined intervals and respectively corresponding to different colors.

6. The image processing apparatus according to claim 1, wherein said reading portion reads the color image data with said reading portion kept stationary and a document moved with respect to said reading portion.

7. An image producing apparatus comprising the image processing apparatus according to claim 1.

8. An image processing method, comprising the steps of:
   inputting color image data read from a document by a reading portion;
   converting a portion of the color image data into chromaticness data;
   detecting, based on lightness data and the chromaticness data, whether said input color image data is out of a predetermined color space; and
   when said color image data is detected by said detecting step to be out of said predetermined color space, determining that said color image data is image noise.

9. The image processing method according to claim 8, wherein said predetermined color space is further determined in accordance with a characteristic of said reading portion.

10. The image processing method according to claim 8, wherein, when the color image data detected by said detecting step to be out of said predetermined color space continues in a sub scanning direction of said reading portion, said determining step determines the continuing color image data as image noise.

11. The image processing method according to claim 8, further comprising the step of correcting the color image data determined by said determining step as image noise.

12. The image processing method according to claim 8, wherein said reading portion includes a reading portion having a plurality of line sensors arranged in a sub scanning direction at predetermined intervals and respectively corresponding to different colors.

13. The image processing method according to claim 8, wherein said reading portion reads the color image data with said reading portion kept stationary and a document moved with respect to said reading portion.

14. The image processing apparatus of claim 1, wherein the lightness data of the color image data is converted using a threshold table to generate a threshold which is compared to the chromaticness data of the color image data to determine if the image data is out of the predetermined color space.

15. The image processing method according to claim 8, wherein the lightness data of the color image data is converted using a threshold table to generate a threshold which is compared to the chromaticness data of the color image data to determine if the image data is out of the predetermined color space.

* * * * *